(12) United States Patent
Nakazawa et al.

(10) Patent No.: US 6,449,100 B2
(45) Date of Patent: Sep. 10, 2002

(54) TELECONVERTER LENS

(75) Inventors: Kimiaki Nakazawa, Saitama (JP); Tomoyuki Baba, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 59 days.

(21) Appl. No.: 09/794,278

(22) Filed: Feb. 28, 2001

(30) Foreign Application Priority Data

Mar. 27, 2000 (JP) ........................................ 2000-086186

(51) Int. Cl.[7] .............................. G02B 15/02; G02B 9/04
(52) U.S. Cl. ...................... 359/673; 359/672; 359/793
(58) Field of Search ................................ 359/673, 793, 359/781, 782, 783, 784, 672

(56) References Cited

U.S. PATENT DOCUMENTS

| 5,218,475 A | 6/1993 | Tsuchida et al. ............ 359/673 |
| 5,555,132 A | 9/1996 | Yamada et al. ............. 359/673 |
| 6,097,547 A | 8/2000 | Ogata et al. ................ 359/673 |

FOREIGN PATENT DOCUMENTS

| JP | 53-27044 | 3/1978 | |
| JP | 55-32046 | 3/1980 | |
| JP | 10-197792 | 7/1998 | |
| JP | P2000-275517 A | * 10/2000 | |
| JP | P2001-228393 A | * 8/2001 | |

* cited by examiner

*Primary Examiner*—Georgia Epps
*Assistant Examiner*—Timothy J Thompson
(74) *Attorney, Agent, or Firm*—Arnold International; Bruce Y. Arnold

(57) ABSTRACT

A teleconverter lens is disclosed, for attachment to the enlarging side of a projection lens, wherein aberrations generated by a negative focusing lens group positioned at the enlarging side of the projection lens are not made greater by the teleconverter lens. The teleconverter lens is substantially afocal and is formed of a front lens group having negative refractive power and a back lens group having positive refractive power. The front lens group is formed of two series of combined lenses, each combined lens being a lens element of positive refractive power and a lens element of negative refractive power that are joined. The back lens group is a single combined lens formed of a lens element of positive refractive power that is joined to a lens element of negative refractive power. The teleconverter lens is detachably attachable at its back side to the enlarging side of the projection lens.

6 Claims, 3 Drawing Sheets

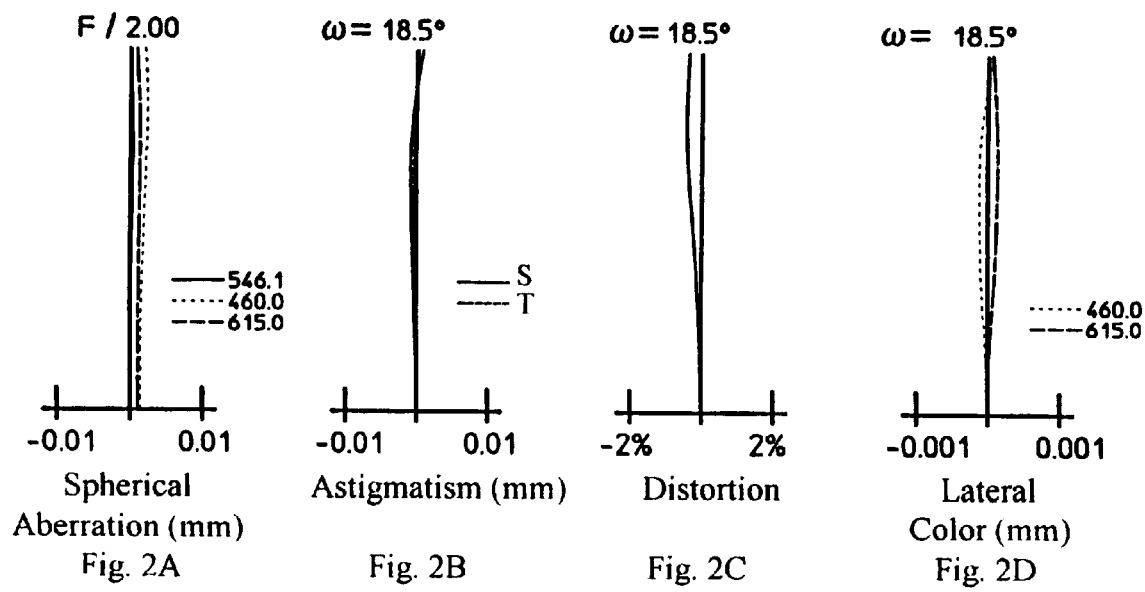
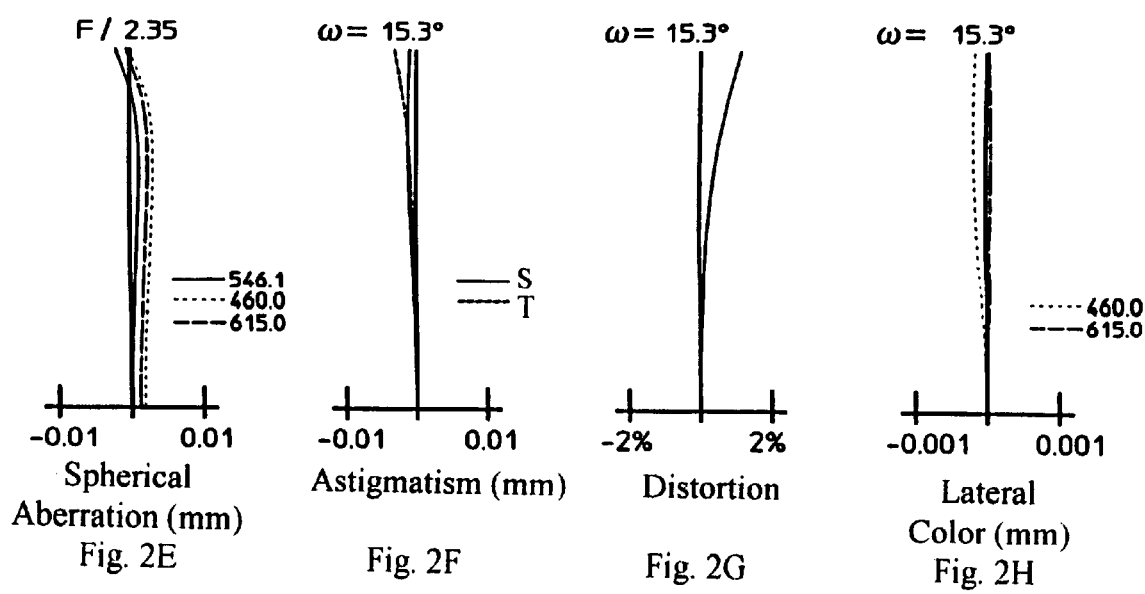

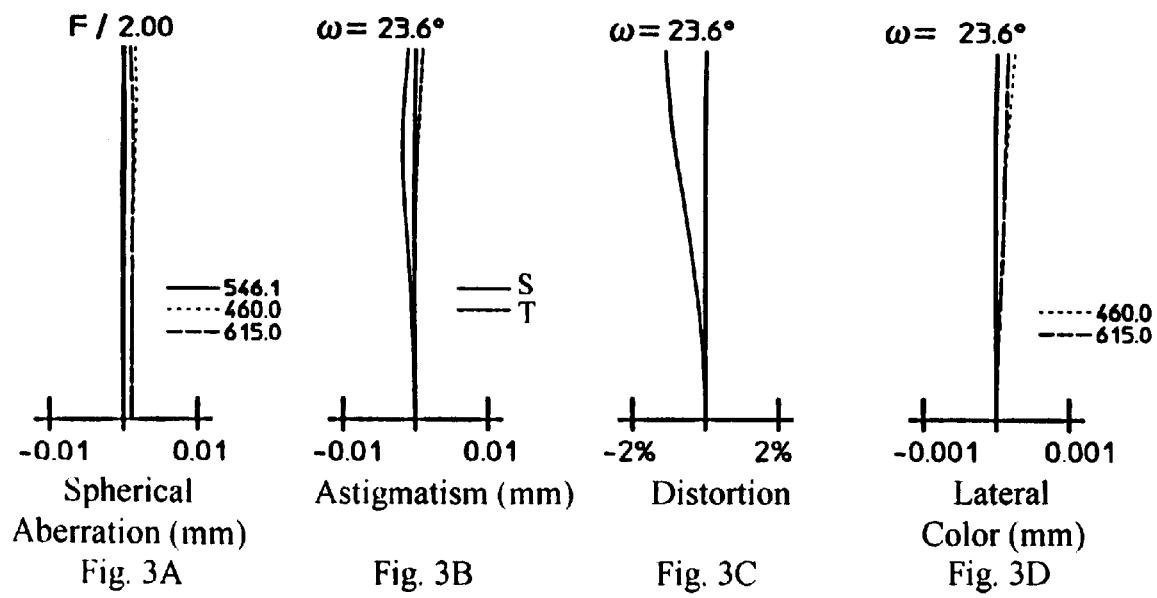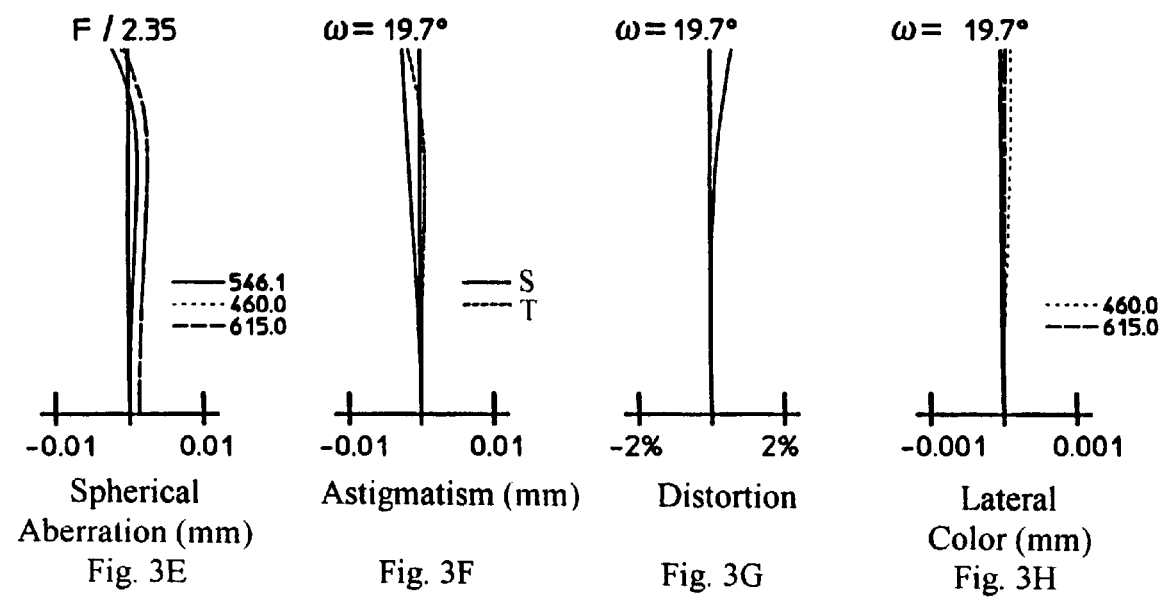

TELECONVERTER LENS

BACKGROUND OF THE INVENTION

Projectors such as a liquid crystal projector have been known. In these projectors, light is irradiated onto the back side of light valves, such as in a liquid crystal display panel array, and the light is then modulated by picture information input to these light valves. The transmitted light is then projected by a projection lens onto a screen as an enlarged image.

As projectors are used in various places with various size audiences, it is advantageous if the focal length of the projection lens can be varied so as to select a projection distance that matches a particular size of projection screen. For example, a projector may be purchased with the intent of using it in a rather small room with a nearby projection screen, but a necessity for using the projector in a large meeting room with a larger projection screen can also arise. In such a case, if an attachment lens for extending the focal distance is added to the projection lens, the projector can be conveniently positioned on the side of the room opposite the screen, with the audience seated between the projector and the screen. Such an attachment lens is called a teleconverter lens because the focal distance is converted towards the telescopic side.

For example, a teleconverter lens as described in Japanese Laid Open Patent Application H10-197792 has been known. This teleconverter lens comprises a front lens group at the large conjugate length side (hereinafter termed the enlarging side) of the teleconverter lens, and a back lens group at the small conjugate length side (hereinafter termed the reducing side) of the teleconverter lens, with a wide air space between these two lens groups. The front lens group is composed of from two to three lens elements, and the back lens group is composed of two lens elements. Further, a combined lens (e.g., one formed of positive and negative lens elements that are cemented together) is arranged on either side, or somewhere within, the teleconverter lens in order to correct for achromatism.

However, the teleconverter lens described above was primarily developed for use as an image pick-up lens of cameras. Thus, it is unsuitable for projecting very fine picture elements of a projection system, especially those that use a liquid crystal panel to modulate the image light onto a screen. A light beam which is transmitted through the liquid crystal display panel and is incident into this projection lens passes successively through the negative focusing lens group at the enlarging side of the projection lens and through the negative back lens group of the teleconverter lens. Thus, certain aberrations generated by the focusing lens group of the projection lens are not compensated for, but are instead enlarged, in passing through the back lens group of the teleconverter lens. More particularly, aberrations such as distortion and lateral color that are introduced by the projection lens are increased by the teleconverter lens to such an extent that the projected images are unsatisfactory.

BRIEF SUMMARY OF THE INVENTION

This invention relates to a teleconverter lens, and particularly to a teleconverter lens that may be mounted to the enlarging side of a projection lens for increasing the focal length of the projection lens. The object of the present invention is to provide a teleconverter lens which may be mounted to a projection lens for increasing its focal length without degrading the image quality of images projected by the projection lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion and lateral color, respectively, of the teleconverter lens of the invention when mounted to the zoom projection lens shown in FIG. 1, with the zoom adjustment at the wide-angle end (WIDE);

FIGS. 2E–2H show the spherical aberration, astigmatism, distortion and lateral color, respectively, of the teleconverter lens of the invention when mounted to the same zoom projection lens used in FIGS. 2A–2D, but with the zoom at the telescopic end (TELE);

FIGS. 3A–3D show the spherical aberration, astigmatism, distortion and lateral color, respectively, at the wide-angle end (WIDE), for the zoom projection lens used in FIGS. 2A–2D, but without the teleconverter lens attached; and FIGS. 3E–3H show the spherical aberration, astigmatism, distortion and lateral color, respectively, at the telescopic end (TELE), for the zoom projection lens used in FIGS. 2A–2D, but without the teleconverter lens attached.

DETAILED DESCRIPTION

Figure 1:
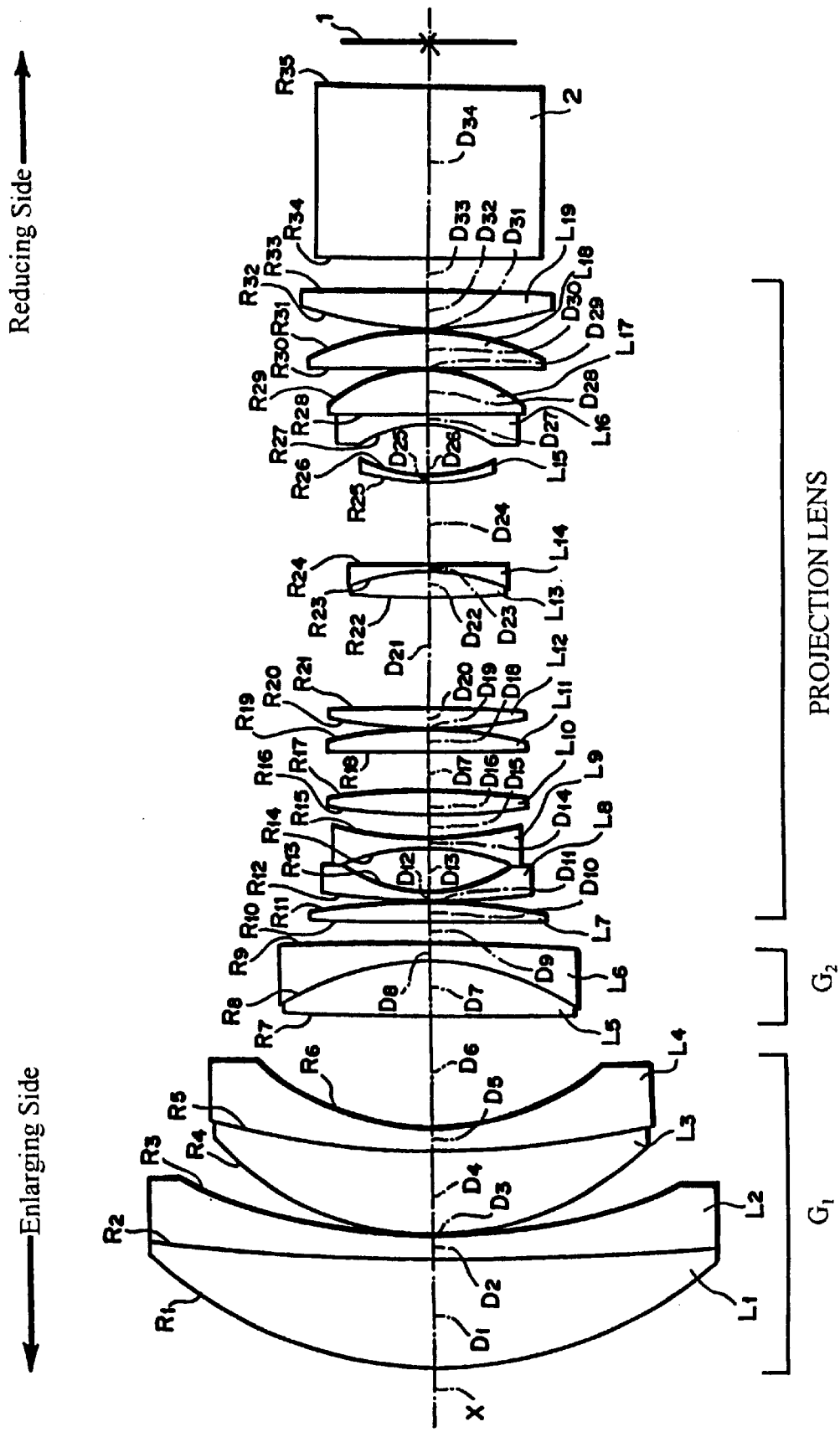
FIG. 1 shows the basic lens element configuration of Embodiment 1 of the teleconverter lens when attached to the enlarging side of a zoom projection lens that is illuminated by light having passed through a display panel and a color-synthesizing optical system.

The teleconverter lens of this invention is substantially afocal and is formed of a front lens group having negative refractive power and a back lens group having positive refractive power, in order from the enlarging side. The front lens group is formed of two sets of combined lenses in series, each formed of a positive meniscus lens element with its convex surface on the enlarging side that is joined to a negative meniscus lens element with its concave surface on the reducing side. The back lens group is formed of a combined lens made of a lens element having surfaces of different radii of curvature and positive refractive power with the surface of smaller radius of curvature being convex on the reducing side and joined to a lens element of negative refractive power. The negative refractive power lens element has surfaces of different radii of curvature, with the surface of smaller radius of curvature being the joined surface that is concave on the enlarging side.

Furthermore, the teleconverter lens of the invention is for mounting to the enlarging side of a projection lens. A specific embodiment of the invention will now be described. First, an example of the teleconverter lens of the invention when mounted to a projection lens will be described, followed by a description of the teleconverter lens itself.

As shown in FIG. 1, the teleconverter lens of the invention may be mounted on the enlarging side of a projection lens of a liquid crystal projector, so as to increase the focal length of the projection lens. In this example the teleconverter lens is formed of a front lens group $G_1$ composed of lens elements $L_1$–$L_4$, and a back lens group $G_2$ composed of lens elements $L_5$ and $L_6$. Because the teleconverter lens is an afocal system, if collimated light is incident on the reducing side it is projected as collimated light. As discussed above, lens elements $L_1$ and $L_2$ are joined to form a combined lens, and lens elements $L_3$ and $L_4$ are joined so as to form a combined lens. Likewise, the fifth lens element $L_5$ and the sixth lens element $L_6$ are joined so as to form a combined lens.

As illustrated in FIG. 1, the projection lens to which the teleconverter lens of the invention may be mounted may be a zoom projection lens. As one example, a zoom lens that is formed of thirteen lens elements $L_7$–$L_{19}$ is illustrated in FIG. 1, with the teleconverter lens being mounted on the enlarging side thereof.

Furthermore, a color-synthesizing optical system 2 and a transmission-type liquid crystal display panel 1 may be arranged on the reducing side of the projection lens. Thus, a light beam which is transmitted through the liquid crystal display panel so as to be modulated with picture information may be incident onto the reducing side of the projection lens along the optical axis. Thus, the incident light is then projected by the projection lens onto a screen (not illustrated) that is located on the enlarging side of the projection lens.

The projection lens for a liquid crystal projector as described above may include, in order from the enlarging side of the projection lens, a lens group of negative refractive power that is used for focus adjustment, a lens group that moves to adjust the zoom amount, and a fixed master lens group. When a conventional teleconverter lens that is formed, in order from the enlarging side, of a front lens group with positive refractive power and a back lens group with negative refractive power, and such a teleconverter lens is mounted on the enlarging side of the above-described projection lens of a liquid crystal projector, pictures projected onto a screen have a problem in that aberrations, especially distortion and lateral color, are excessive. This problem is avoided with the present invention.

In the teleconverter lens of the present invention, a front lens group having a negative refractive power and a back lens group having a positive refractive power are arranged with the back lens group adjacent the focusing lens group of the projection lens. Thus, aberrations generated in the negative focusing lens group of the projection lens are not made larger in passing through a second negative lens group in succession. Rather, following the negative focusing lens group, the light enters the positive back lens group of the teleconverter lens. Thus, pictures projected onto a screen located on the enlarging side of the projection lens have roughly the same, or in some ways even better, image quality as when the projection lens is used to project images without the teleconverter lens attached.

Table 1 below lists, for a zoom projection lens with teleconverter lens attached, the surface number #, in order from the enlarging side, the radius of curvature R of each surface, the on-axis spacing D between surfaces, as well as the index of refraction $N_e$ and the Abbe value $\upsilon_e$ (at the e line) of each lens element of the teleconverter lens (surfaces 1–9), as well as of the zoom projection lens (surfaces 10–35). In the bottom portion of the table are listed the ranges of focal length f, f-number $F_{NO}$ and picture angle $2\omega$ between the wide-angle and telescopic ends. The numbers listed in the table for R and D have been normalized to make the focal length of the projection lens be unity at the wide-angle end, without the teleconverter lens attached.

TABLE 1

| # | R | D | $N_e$ | $\nu_e$ |
|---|---|---|---|---|
| 1 | 2.073 | 0.521 | 1.63003 | 35.4 |
| 2 | 14.158 | 0.111 | 1.67340 | 47.0 |
| 3 | 2.933 | 0.006 | | |
| 4 | 1.461 | 0.417 | 1.51825 | 63.9 |
| 5 | 4.337 | 0.111 | 1.85501 | 23.7 |
| 6 | 1.220 | 0.580 | | |
| 7 | 38.305 | 0.287 | 1.63003 | 25.4 |
| 8 | −1.258 | 0.084 | 1.62287 | 60.1 |
| 9 | −19.669 | 0.111 | | |
| 10 | ∞ | 0.095 | 1.71615 | 53.7 |
| 11 | −3.011 | 0.006 | | |
| 12 | 4.063 | 0.046 | 1.48914 | 70.2 |
| 13 | 0.770 | 0.215 | | |
| 14 | −1.096 | 0.040 | 1.83930 | 37.1 |
| 15 | 1.705 | 0.115 | | |
| 16 | 3.396 | 0.120 | 1.81263 | 25.3 |
| 17 | −3.396 | D17 (variable) | | |
| 18 | −25.142 | 0.104 | 1.71615 | 53.7 |
| 19 | −1.885 | 0.006 | | |
| 20 | 2.414 | 0.099 | 1.80831 | 46.3 |
| 21 | −8.685 | D21 (variable) | | |
| 22 | 2.756 | 0.140 | 1.77621 | 49.4 |
| 23 | −0.985 | 0.040 | 1.72310 | 29.3 |
| 24 | −12.321 | D24 (variable) | | |
| 25 | 1.114 | 0.039 | 1.85504 | 23.6 |
| 26 | 0.745 | D26 (variable) | | |
| 27 | −0.567 | 0.046 | 1.85504 | 23.6 |
| 28 | ∞ | 0.220 | 1.48914 | 70.2 |
| 29 | −0.705 | 0.006 | | |
| 30 | ∞ | 0.186 | 1.77621 | 49.4 |
| 31 | −1.232 | 0.022 | | |
| 32 | 1.996 | 0.178 | 1.85504 | 23.6 |
| 33 | −17.052 | 0.168 | | |
| 34 | ∞ | 0.870 | 1.51825 | 63.9 |
| 35 | ∞ | | | | f = 1.3–1.56 $F_{NO}$ = 2.0–2.3 $2\omega$ = 37.0–30.6

Table 2 below lists the values of the variables D17, D21, D24 and D26 (i.e., the group spacings of the zoom projection lens) at the wide-angle and telescopic ends. Again, the numbers listed have been normalized to provide a focal length of unity at the wide-angle end, without the converter lens attached.

TABLE 2

| Group Spacings: | D17 | D21 | D24 | D26 |
|---|---|---|---|---|
| WIDE: | 0.181 | 0.566 | 0.397 | 0.260 |
| TELE: | 0.050 | 0.335 | 0.577 | 0.442 |

Table 3 below lists, for the same zoom projection lens as discussed above but without the teleconverter lens of the invention attached, the surface number #, in order from the enlarging side, the radius of curvature R of each surface, the on-axis spacing D between surfaces, as well as the index of refraction $N_e$ and the Abbe value $\upsilon_e$ (at the e line) of each lens element of the zoom projection lens. Note that surface #10–#35 of Table 1 are now listed as surfaces #1–#26, since the teleconverter lens is no longer attached to the enlarging side of the zoom projection lens. In the bottom portion of the table are listed the ranges of focal length f, f-number $F_{NO}$ and picture angle $2\omega$ between the wide-angle end and telepscopic end. As before, the numbers listed in the table for R and D have been normalized to make the focal length of the projection lens be unity at the wide-angle end, without the teleconverter lens attached.

TABLE 3

| # | R | D | $N_e$ | $v_e$ |
|---|---|---|---|---|
| 1 | ∞ | 0.095 | 1.71615 | 53.7 |
| 2 | −3.011 | 0.006 | | |
| 3 | 4.063 | 0.046 | 1.48914 | 70.2 |
| 4 | 0.770 | 0.215 | | |
| 5 | −1.096 | 0.040 | 1.83930 | 37.1 |
| 6 | 1.705 | 0.115 | | |
| 7 | 3.396 | 0.120 | 1.81263 | 25.3 |
| 8 | −3.396 | D8 (variable) | | |
| 9 | −25.142 | 0.104 | 1.71615 | 53.7 |
| 10 | −1.885 | 0.006 | | |
| 11 | 2.414 | 0.099 | 1.80831 | 46.3 |
| 12 | −8.685 | D12 (variable) | | |
| 13 | 2.756 | 0.140 | 1.77621 | 49.4 |
| 14 | −0.985 | 0.040 | 1.72310 | 29.3 |
| 15 | −12.321 | D15 (variable) | | |
| 16 | 1.114 | 0.039 | 1.85504 | 23.6 |
| 17 | 0.745 | D17 (variable) | | |
| 18 | −0.567 | 0.046 | 1.85504 | 23.6 |
| 19 | ∞ | 0.220 | 1.48914 | 70.2 |
| 20 | −0.705 | 0.006 | | |
| 21 | ∞ | 0.186 | 1.77621 | 49.4 |
| 22 | −1.232 | 0.022 | | |
| 23 | 1.996 | 0.178 | 1.85504 | 23.6 |
| 24 | −17.052 | 0.168 | | |
| 25 | ∞ | 0.870 | 1.51825 | 63.9 |
| 26 | ∞ | | | | f = 1.0–1.2 Fno = 2.0–2.3 2 = 47.2–39.4

Table 4 below lists the values of the variables D8, D12, D15 and D17 (i.e., these are the group spacings of the zoom projection lens) at the wide-angle and telescopic ends.

TABLE 4

| Group Spacings: | D8 | D12 | D15 | D17 |
|---|---|---|---|---|
| WIDE | 0.181 | 0.566 | 0.397 | 0.260 |
| TELE | 0.050 | 0.335 | 0.577 | 0.442 |

As can be seen by comparing the group spacings of TABLES 2 and 4, the only differences are in the surface number itself, since the construction of the zoom projection lens itself has not changed.

FIGS. 2A–2D show the spherical aberration, astigmatism, distortion and lateral color, respectively, of the teleconverter lens of the invention when mounted to a zoom projection lens at the wide-angle end (WIDE);

FIGS. 2E–2H show the spherical aberration, astigmatism, distortion and lateral color, respectively, of the teleconverter lens of the invention when mounted to the same zoom projection lens used in FIGS. 2A–2D, but at the telescopic end (TELE);

FIGS. 3A–3D show the spherical aberration, astigmatism, distortion and lateral color, respectively, at the wide-angle end (WIDE), for the projection lens used in FIGS. 2A–2D, but without the teleconverter lens attached; and FIGS. 3E–3H show the spherical aberration, astigmatism, distortion and lateral color, respectively, at the telescopic end (TELE), for the projection lens used in FIGS. 2A–2D, but without the teleconverter lens attached.

In each of these figures ω is the half-image angle, and in those figures which illustrate spherical aberration and lateral color, curves are shown for the wavelengths indicated (in nm). Furthermore, in the figures which illustrate astigmatism, curves are shown for both the sagittal image surface S and the tangential image surface T. As is evident from these figures, the various aberrations do not increase in the case where the teleconverter lens is attached to the projection lens. In fact, the teleconverter lens actually decreases the amount of distortion and lateral color.

The invention being thus described, it will be obvious that the same may be varied in many ways. For example, the values of R and D in the tables above may be appropriately scaled, the front surface of the fifth lens element $L_5$ may be planar or concave instead of convex, and the back surface of the sixth lens element $L_6$ may be planar or concave instead of convex. Further, although the teleconverter lens is disclosed above as being used with a projection lens that employs a transmission-type liquid crystal panel to modulate the light, other modulators may be readily used, such as a reflection-type liquid crystal panel, a DMD array, and so on. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A teleconverter lens for attachment to the enlarging side of a projection lens, said teleconverter lens being substantially afocal and formed of a front lens group having negative refractive power and a back lens group having positive refractive power, said teleconverter lens being detachably attachable at its back side to said projection lens, said front lens group being formed of two series of combined lenses, each combined lens being formed of a lens element of positive refractive power and a lens element of negative refractive power that are joined.

2. The teleconverter lens of claim 1, each said combined lens having a convex surface at its front side and a concave surface at its back side.

3. The teleconverter lens of claim 1, said back lens group being a combined lens formed of a lens element of positive refractive power and a lens element of negative refractive power that are joined.

4. The teleconverter lens of claim 1, in combination with a projection lens.

5. The teleconverter lens of claim 2, in combination with a projection lens.

6. The teleconverter lens of claim 3, in combination with a projection lens.

* * * * *

UNITED STATES PATENT AND TRADEMARK OFFICE
CERTIFICATE OF CORRECTION

PATENT NO. : 6,449,100 B2
DATED : September 10, 2002
INVENTOR(S) : Nakazawa et al.

It is certified that error appears in the above-identified patent and that said Letters Patent is hereby corrected as shown below:

Column 5,
Line 27, change "2 = 47.2 - 39.4" to -- $2\omega$ = 47.2 - 39.4 --.

Signed and Sealed this

Twenty-eighth Day of January, 2003

JAMES E. ROGAN
*Director of the United States Patent and Trademark Office*